US008193850B2

(12) United States Patent
Chen et al.

(10) Patent No.: US 8,193,850 B2
(45) Date of Patent: Jun. 5, 2012

(54) MIX MODE WIDE RANGE MULTIPLIER AND METHOD THEREOF

(75) Inventors: Yueh-Ming Chen, Taipei (TW); Isaac Y Chen, Hsinchu (TW); Shao-Hung Lu, Taoyuan (TW)

(73) Assignee: Richtek Technology Corp., Hsinchu (TW)

( * ) Notice: Subject to any disclaimer, the term of this patent is extended or adjusted under 35 U.S.C. 154(b) by 0 days.

(21) Appl. No.: 12/985,587

(22) Filed: Jan. 6, 2011

(65) Prior Publication Data

US 2011/0169546 A1 Jul. 14, 2011

(30) Foreign Application Priority Data

Jan. 11, 2010 (TW) ................................ 099100522

(51) Int. Cl.
*G06F 7/44* (2006.01)
*G06G 7/16* (2006.01)

(52) U.S. Cl. ........................................ 327/356; 708/835

(58) Field of Classification Search ........................ None
See application file for complete search history.

(56) References Cited

U.S. PATENT DOCUMENTS

| | | | | |
|---|---|---|---|---|
| 3,562,553 | A * | 2/1971 | Roth | 327/356 |
| 3,784,803 | A * | 1/1974 | Brendle | 708/838 |
| 5,408,422 | A * | 4/1995 | Takatori et al. | 708/7 |
| 6,074,082 | A * | 6/2000 | Gilbert | 708/835 |
| 7,009,442 | B2 * | 3/2006 | Chu | 327/356 |
| 7,321,253 | B2 * | 1/2008 | Hirabayashi et al. | 327/355 |
| 2011/0169473 | A1 * | 7/2011 | Chen et al. | 323/298 |

* cited by examiner

*Primary Examiner* — Tuan T Lam
(74) *Attorney, Agent, or Firm* — Rosenberg, Klein & Lee

(57) ABSTRACT

A mix mode wide range multiplier and method are provided for multiplying a first signal by a second signal to generate an output signal. A reference signal is generated according to a first gain and a reference value, the output signal is generated according to a second gain and the first signal, a target value is generated according to the second signal, the first gain is adjusted to make the reference signal equal to the target value, and the second gain is adjusted to maintain a ratio of the second gain to the first gain.

31 Claims, 5 Drawing Sheets

MIX MODE WIDE RANGE MULTIPLIER AND METHOD THEREOF

FIELD OF THE INVENTION

The present invention is related generally to a multiplier and, more particularly, to a mix mode wide range multiplier.

BACKGROUND OF THE INVENTION

The conventional analog divider is constructed from MOSFETs, for example, see N. Kiatwarin, C. Sawigun, and W. Kiranon, "A Low Voltage Four-Quadrant Analog Multiplier Using Triode-MOSFETs," Proc. ISCIT 2006, Bangkok, Thailand, pp. F3D-4, October 2006, and operates with the MOSFETs in their triode region, and thus only accepts the input signals limited within a certain range, making it only suitable for AC small signal applications. For DC large signal applications, the digital multiplier is usually used instead. However, the digital multiplier is disadvantageous because it requires greater space on a chip.

SUMMARY OF THE INVENTION

An object of the present invention is to provide a mix mode approach to implement a voltage/current multiplier.

Another object of the present invention is to provide a wide range multiplier and method.

According to the present invention, a mix mode wide range multiplier for multiplying a first signal by a second signal to generate an output signal includes a gain adjuster to generate a reference signal according to a reference value, a gain duplicator to generate the output signal according to the first signal, a gain controller to generate a target value according to the second signal, a comparator to compare the reference signal with the target value to generate a comparison signal, and a digital circuit to generate a control signal according to the comparison signal to adjust the gain of the gain adjuster to make the reference signal equal to the target value and to adjust the gain of the gain duplicator to maintain a ratio of the gain of the gain duplicator to the gain of the gain adjuster.

According to the present invention, a method for multiplying a first signal by a second signal to generate an output signal generates a reference signal according to a first gain and a reference value, generates the output signal according to a second gain and the first signal, generates a target value according to the second signal, compares the reference signal with the target value to generate a comparison signal, generates a control signal according to the comparison signal, adjusts the first gain according to the control signal to make the reference signal equal to the target value, and adjusts the second gain according to the control signal to maintain a ratio of the second gain to the first gain.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
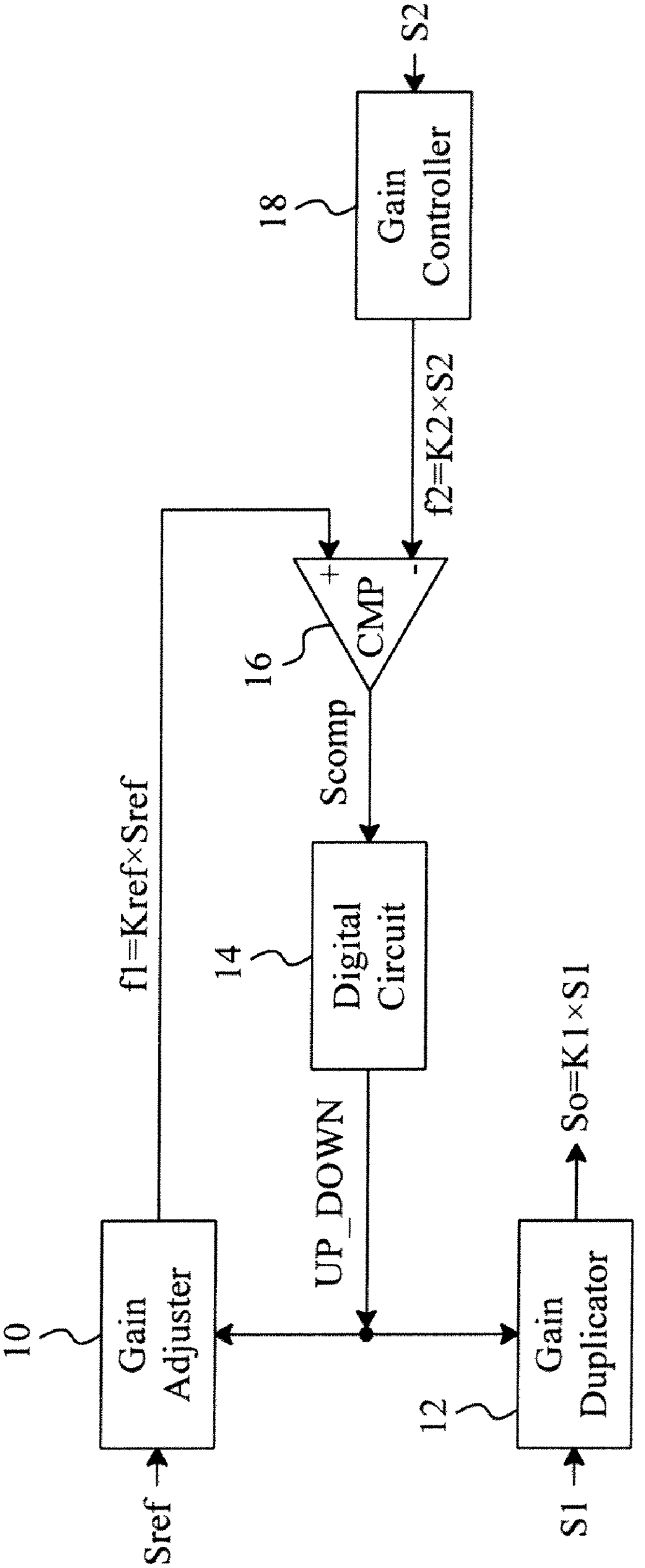
FIG. 1 is a block diagram of a mix mode wide range multiplier according to the present invention.

FIG. 1 is a block diagram of a mix mode wide range multiplier according to the present invention, in which a gain adjuster 10 converts a reference value Sref into a reference signal $$f(Sref)=f1=Kref\times Sref, \quad \text{[Eq-1]}$$

where Kref is the gain of the gain adjuster 10, a gain duplicator 12 converts a first input signal S1 into an output signal $$So=K1\times S1, \quad \text{[Eq-2]}$$

where K1 is the gain of the gain duplicator 12, a gain controller 18 converts a second input signal S2 into a target value $$f(S2)=f2=K2\times S2, \quad \text{[Eq-3]}$$

where K2 is the gain of the gain controller 18, a comparator 16 compares the reference signal f1 with the target value f2 to generate a comparison signal Scomp, and responsive thereto, a digital circuit 14 generates a control signal UP_DOWN to adjust the gain Kref of the gain adjuster 10 to make the reference signal f1 equal to the target value f2 and to adjust the gain K1 of the gain duplicator 12 to maintain a ratio of K1 to Kref, for example as $$K1=m\times Kref, \quad \text{[Eq-4]}$$

where m is a constant. In steady state, f1=f2 and thus it will have $$Kref = \frac{(K2\times S2)}{Sref} = \left(\frac{K2}{Sref}\right)\times S2, \quad \text{[Eq-5]}$$

according to the equations Eq-1 and Eq-3, and $$So = \{m\times[(K2/Sref)\times S2]\}\times S1 = (m\times K2/Sref)\times S1\times S2, \quad \text{[Eq-6]}$$

according to the equation Eq-4. As shown in the equation Eq-6, the output signal So includes the product of the input signals S1 and S2. Preferably, the digital circuit 14 further stores values representative of the gains Kref and K1, so that when the multiplier suffers input transient, the digital circuit 14 can instantly adjust and align the gains Kref and K1 of the gain adjuster 10 and the gain duplicator 12 with the values it stores, thus needing not to perform the adjustment from the very beginning.

Figure 2:
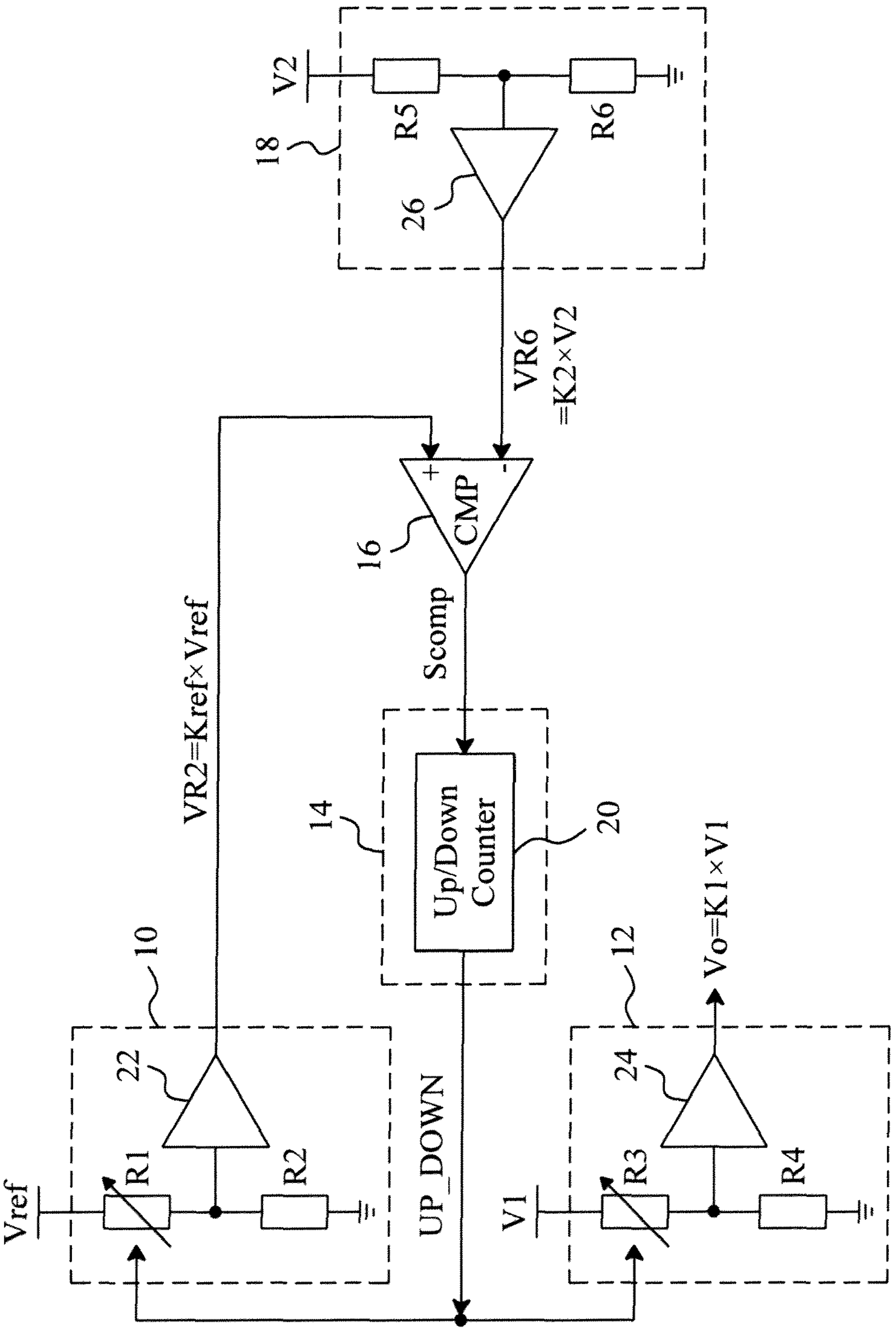
FIG. 2 is a circuit diagram of an embodiment where the mix mode wide range multiplier of FIG. 1 is applied to a voltage multiplier.

FIG. 2 is a circuit diagram of an embodiment where the mix mode wide range multiplier of FIG. 1 is applied to a voltage multiplier, for multiplying a voltage V1 by a voltage V2 to generate an output voltage V0. In FIG. 2, a reference voltage Vref is used as the reference value Sref, and the gain adjuster 10 includes a variable resistor R1 and a resistor R2 to establish a voltage divider to divide the reference voltage Vref to generate a divided voltage VR2 to output with a buffer 22. The variable resistor R1 and the resistor R2 are connected in series between the voltage source Vref and ground, to thereby set the gain $$Kref=R2/(R1+R2). \quad \text{[Eq-7]}$$

In the gain duplicator 12, resistors R3 and R4 establish a voltage divider to divide the first input voltage V1 to generate a divided voltage V0 to output with a buffer 24. The resistors R3 and R4 are connected in series between the voltage source V1 and ground, to thereby set the gain K1=R4/(R3+R4). In the gain controller 18, resistors R5 and R6 establish a voltage divider to divide the second input voltage V2 to generate a divided voltage VR6 to output with a buffer 26. The resistors R5 and R6 are connected in series between the voltage source V2 and ground, to thereby set the gain $$K2=R6/(R5+R6). \quad \text{[Eq-8]}$$

The digital circuit 14 has an up-down counter 20 to adjust the resistances of the variable resistors R1 and R3. According to the equation Eq-6, it will have the output voltage $$\begin{aligned} Vo &= \{m \times [R6/(R5+R6)]/Vref\} \times V1 \times V2 \quad \text{[Eq-9]} \\ &= \{(m \times R6)/[R5+R6] \times Vref\} \times V1 \times V2, \end{aligned}$$

which includes the product of the input voltages V1 and V2. Preferably, the up-down counter 20 stores values representative of the resistances of the variable resistors R1 and R3, so that when input transient occurs, the up-down counter 20 can instantly align the resistances of the variable resistors R1 and R3 with the values it stores, thereby adjusting the gains Kref and K1.

Figure 3:
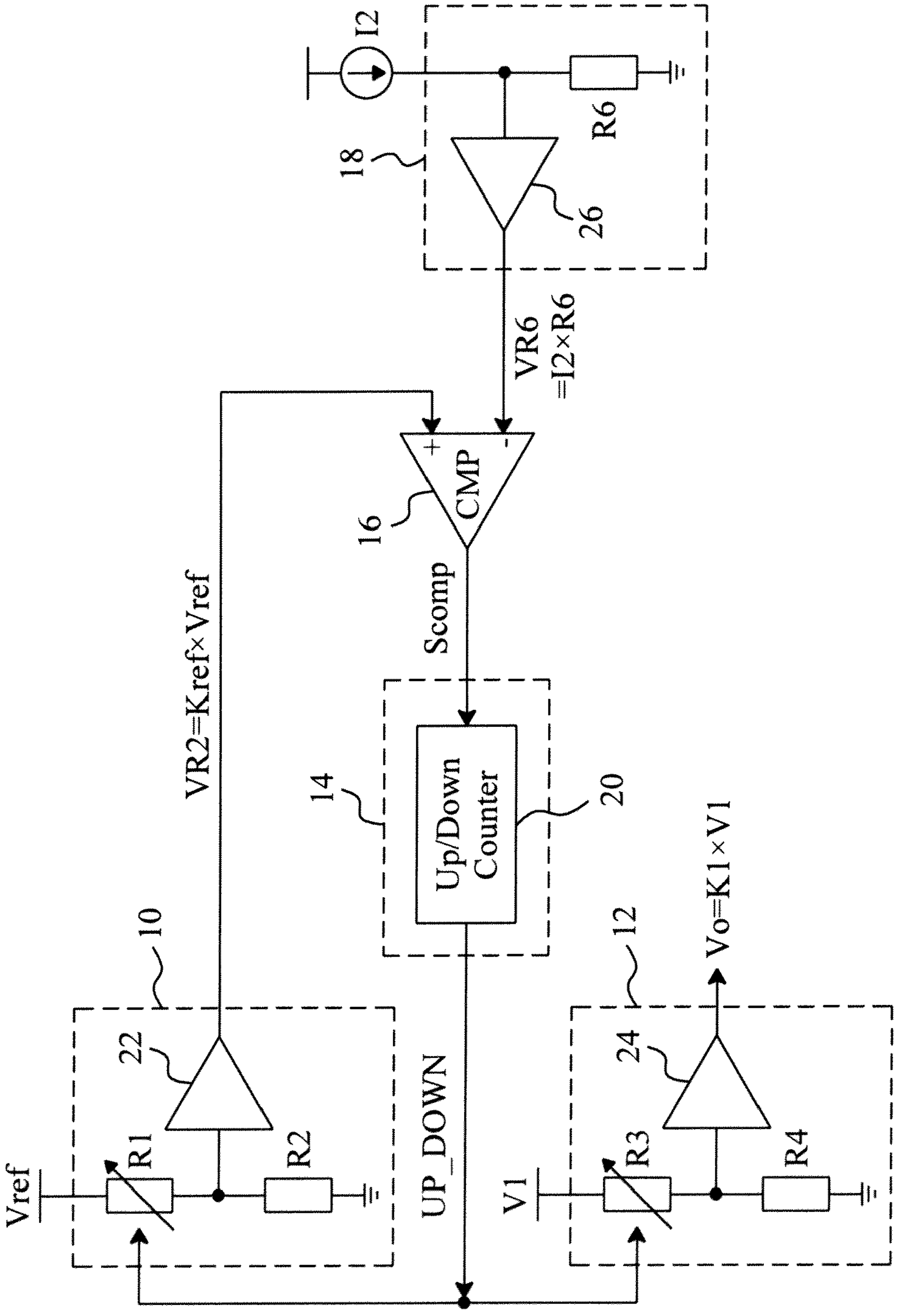
FIG. 3 is a circuit diagram of an embodiment where the mix mode wide range multiplier of FIG. 1 is applied to a voltage-current multiplier.

FIG. 3 is a circuit diagram of an embodiment where the mix mode wide range multiplier of FIG. 1 is applied to a voltage-current multiplier, for multiplying an input voltage V1 by an input current I2 to generate an output voltage V0. In this embodiment, the gain adjuster 10, the gain duplicator 12, the digital circuit 14 and the comparator 16 are the same as that of FIG. 2, while the gain controller 18 has the resistor R6 receiving the input current I2 to generate a voltage VR6=I2×R6 to output with the buffer 26, and thus sets the gain $$K2=R6. \quad \text{[Eq-10]}$$

In steady state, VR2=VR6, and from the equations Eq-6 and Eq-10, it will have the output voltage $$Vo=(m \times R6/Vref) \times V1 \times I2, \quad \text{[Eq-11]}$$

which includes the product of the input voltage V1 and the input current I2.

Figure 4:
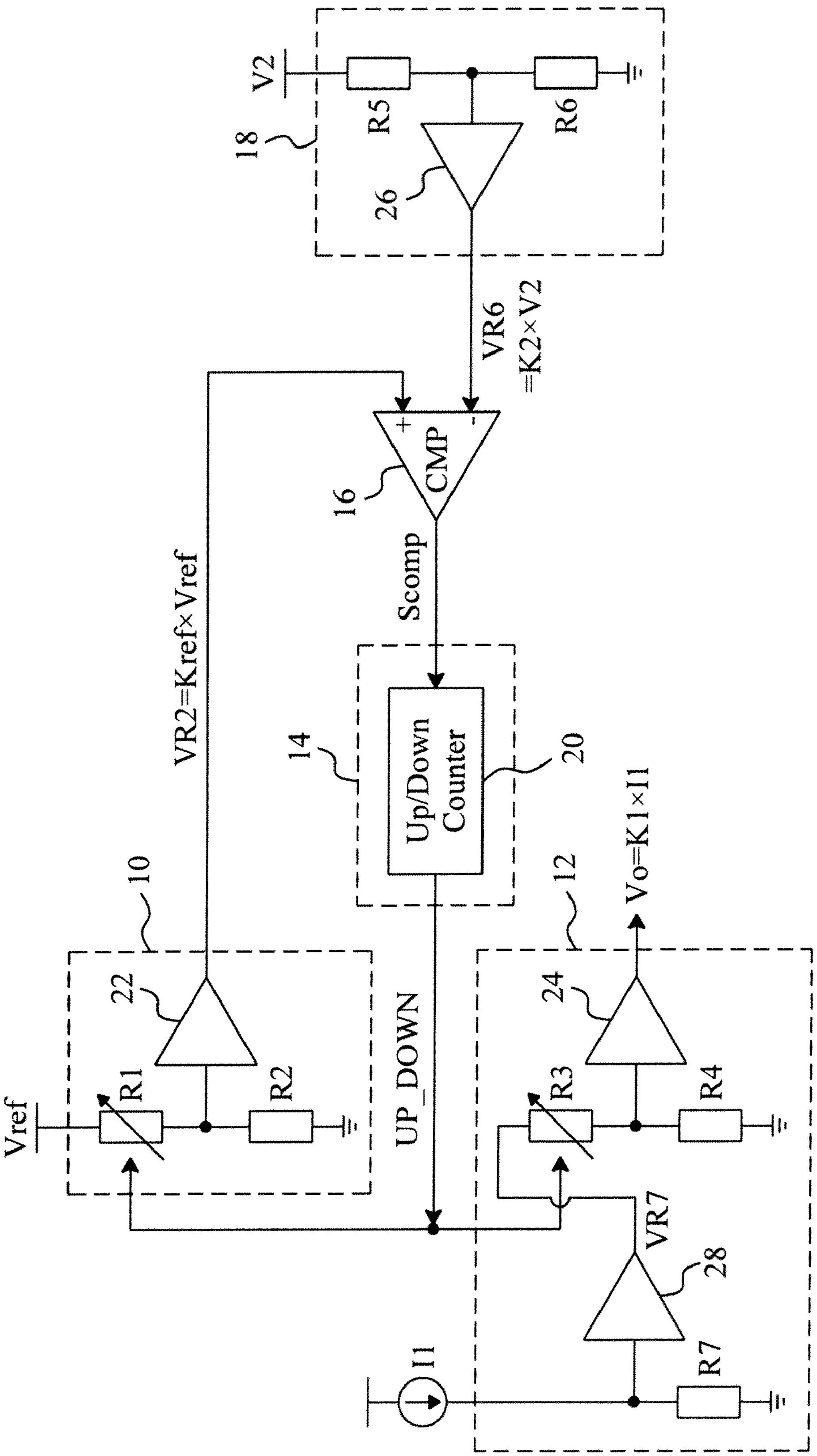
FIG. 4 is a circuit diagram of another embodiment where the mix mode wide range multiplier of FIG. 1 is applied to another voltage-current multiplier.

FIG. 4 is a circuit diagram of another embodiment where the mix mode wide range multiplier of FIG. 1 is applied to a voltage-current multiplier, for multiplying an input current I1 by an input voltage V2 to generate an output voltage Vo. In this embodiment, the gain adjuster 10, the digital circuit 14, the comparator 16 and the gain controller 18 are the same as that of FIG. 2, while in the gain duplicator 12, in addition to the variable resistor R3, the resistor R4 and the buffer 24, a resistor R7 receives the input current I1 to generate a voltage VR7=I1×R7 to apply to the voltage divider of the variable resistor R3 and the resistor R4 through a buffer 28. According to the equations Eq-6 and Eq-8, this voltage-current multiplier has the output voltage $$\begin{aligned} Vo &= \{m \times [R6/(R5+R6)]/Vref\} \times I1 \times V2 \quad \text{[Eq-12} \\ &= \{(m \times R6)/[(R5+R6) \times Vref]\} \times I1 \times V2, \end{aligned}$$

which includes the product of the input current I1 and the input voltage V2.

Figure 5:
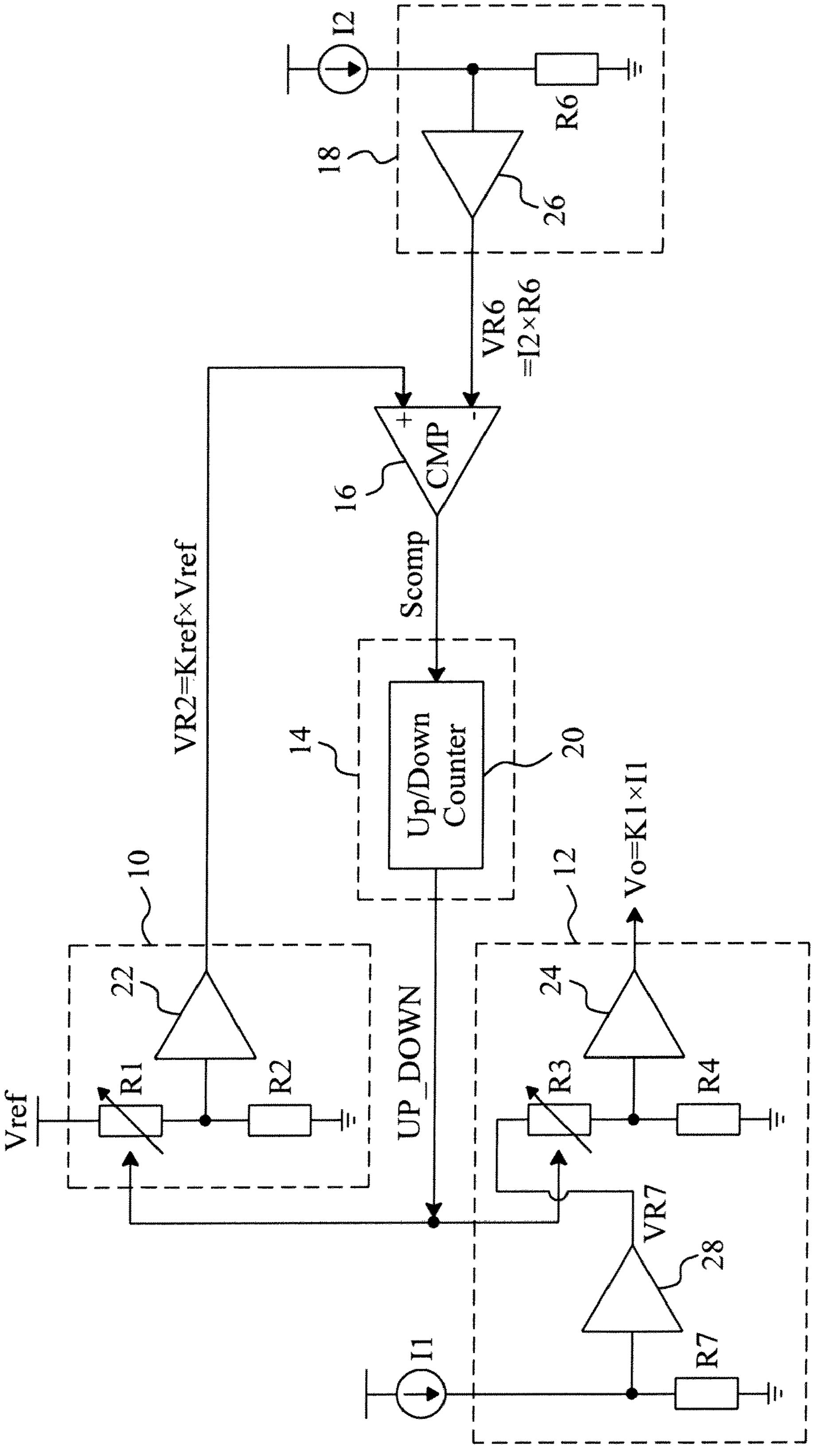
FIG. 5 is a circuit diagram of an embodiment where the mix mode wide range multiplier of FIG. 1 is applied to a current multiplier.

FIG. 5 is a circuit diagram of an embodiment where the mix mode wide range multiplier of FIG. 1 applied to a current multiplier, for multiplying a first input current I1 by a second input current I2 to generate an output voltage Vo. In this embodiment, the gain adjuster 10, the gain duplicator 12, the digital circuit 14 and the comparator 16 are the same as that of FIG. 4, and the gain controller 18 is the same as that of FIG. 3. In steady state, according to the equations Eq-6 and Eq-10, it will have the output voltage $$Vo=(m \times R6/Vref) \times I1 \times I2, \quad \text{[Eq-13]}$$

which includes the product of the input currents I1 and I2.

According to the present invention, a multiplier is designed based on the Ohm's law, using a resistor to convert the input voltage or the input current into a current or a voltage, for producing the output signal Vo, and is thus not limited in its input range, while has simpler circuit that is easier to implement.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth the appended claims.

What is claimed is:

1. A mix mode wide range multiplier for multiplying a first signal by a second signal to generate an output signal, comprising:
   - a gain adjuster having a first gain, operative to generate a reference signal according to a reference value;
   - a gain duplicator having a second gain, operative to generate the output signal according to the first signal;
   - a gain controller operative to generate a target value according to the second signal;
   - a comparator connected to the gain adjuster and the gain controller, comparing the reference signal with the target value to generate a comparison signal; and
   - a digital circuit connected to the comparator, the gain adjuster and the gain duplicator, responsive to the comparison signal to generate a control signal to adjust the first gain to make the reference signal equal to the target value and to adjust the second gain to maintain a ratio of the second gain to the first gain.

2. The mix mode wide range multiplier of claim 1, wherein the reference value is represented by a voltage.

3. The mix mode wide range multiplier of claim 2, wherein the gain adjuster comprises a voltage divider having a dividing ratio adjusted by the control signal, for dividing the voltage to generate a divided voltage for generating the reference signal.

4. The mix mode wide range multiplier of claim 3, wherein the voltage divider comprises:
   - a variable resistor having a resistance adjusted by the control signal; and
   - a resistor serially connected to the variable resistor for dividing the voltage.

5. The mix mode wide range multiplier of claim 1, wherein the first signal is represented by a voltage.

6. The mix mode wide range multiplier of claim 5, wherein the gain duplicator comprises a voltage divider having a dividing ratio adjusted by the control signal, for dividing the voltage to generate a divided voltage for generating the output signal.

7. The mix mode wide range multiplier of claim 6, wherein the voltage divider comprises:

a variable resistor having a resistance adjusted by the control signal; and a resistor serially connected to the variable resistor for dividing the voltage.

8. The mix mode wide range multiplier of claim 1, wherein the first signal is represented by a current.

9. The mix mode wide range multiplier of claim 8, wherein the gain duplicator comprises:

a resistor receiving the current to generate a voltage; and a voltage divider having a dividing ratio adjusted by the control signal, for dividing the voltage to generate a divided voltage for generating the output signal.

10. The mix mode wide range multiplier of claim 9, wherein the voltage divider comprises:

a variable resistor having a resistance adjusted by the control signal; and a second resistor serially connected to the variable resistor for dividing the voltage.

11. The mix mode wide range multiplier of claim 1, wherein the second signal is represented by a voltage.

12. The mix mode wide range multiplier of claim 11, wherein the gain controller comprises a voltage divider for dividing the voltage to generate the target value.

13. The mix mode wide range multiplier of claim 12, wherein the voltage divider comprises:

a first resistor; and a second resistor serially connected to the first resistor for dividing the voltage.

14. The mix mode wide range multiplier of claim 1, wherein the second signal is represented by a current.

15. The mix mode wide range multiplier of claim 14, wherein the gain controller comprises a resistor receiving the current for generating the target value.

16. The mix mode wide range multiplier of claim 1, wherein the digital circuit comprises an up-down counter for generating the control signal according to the comparison signal.

17. The mix mode wide range multiplier of claim 1, wherein the digital circuit stores values representative of the first and second gains.

18. A method for multiplying a first signal by a second signal to generate an output signal, comprising the steps of:

A.) generating a reference signal according to a first gain and a reference value;

B.) generating the output signal according to a second gain and the first signal;

C.) generating a target value according to the second signal;

D.) comparing the reference signal with the target value to generate a comparison signal;

E.) generating a control signal according to the comparison signal;

F.) adjusting the first gain according to the control signal to make the reference signal equal to the target value; and G.) adjusting the second gain according to the control signal to maintain a ratio of the second gain to the first gain.

19. The method of claim 18, further comprising the step of providing a voltage representing the reference value.

20. The method of claim 19, wherein the step A comprises the step of dividing the voltage according to a dividing ratio to generate a divided voltage for generating the reference signal.

21. The method of claim 20, wherein the step A comprises the step of adjusting the dividing ratio according to the control signal.

22. The method of claim 21, wherein the step of adjusting the dividing ratio according to the control signal comprises the steps of:

serially connecting two resistors to establish a voltage divider having the dividing ratio; and adjusting a resistance of one of the two resistors according to the control signal.

23. The method of claim 18, wherein the first signal is represented by a voltage, and the step B comprises the step of dividing the voltage according to a dividing ratio to generate a divided voltage for generating the output signal.

24. The method of claim 23, wherein the step B comprises the step of adjusting the dividing ratio according to the control signal.

25. The method of claim 24, wherein the step of adjusting the dividing ratio according to the control signal comprises the steps of:

serially connecting two resistors to establish a voltage divider having the dividing ratio; and adjusting a resistance of one of the two resistors according to the control signal.

26. The method of claim 18, wherein the first signal is represented by a current, and the step B comprises the steps of:

converting the current into a voltage; and dividing the voltage according to a dividing ratio to generate a divided voltage for generating the output signal.

27. The method of claim 26, wherein the step B comprises the step of adjusting the dividing ratio according to the control signal.

28. The method of claim 27, wherein the step of adjusting the dividing ratio according to the control signal comprises the steps of:

serially connecting two resistors to establish a voltage divider having the dividing ratio; and adjusting a resistance of one of the two resistors according to the control signal.

29. The method of claim 18, wherein the second signal is represented by a voltage, and the step C comprises the step of dividing the voltage according to a dividing ratio to generate a divided voltage for generating the target value.

30. The method of claim 18, wherein the second signal is represented by a current, and the step C comprises the steps of:

converting the current into a voltage; and dividing the voltage according to a dividing ratio to generate a divided voltage for generating the target value.

31. The method of claim 18, further comprising the step of storing values representative of the first and second gains.

* * * * *